United States Patent

Sherman et al.

[15] 3,646,755
[45] Mar. 7, 1972

[54] VARIABLE GEOMETRY TORQUE CONVERTER

[72] Inventors: Warren S. Sherman, Indianapolis; Dennis L. Troth, Speedway, both of Ind.; William A. Bennett, Danville, Ill.

[73] Assignee: General Motors Corporation, Detroit, Mich.

[22] Filed: Sept. 14, 1970

[21] Appl. No.: 71,992

[52] U.S. Cl. .............................................................. 60/54
[51] Int. Cl. ....................................................... F16d 33/00
[58] Field of Search .................................................. 60/54

[56] References Cited

UNITED STATES PATENTS 3,014,430 12/1961 Schneider ........................... 60/54 X
3,151,457 10/1964 Jandasek ............................... 60/54

Primary Examiner—Edgar W. Geoghegan
Attorney—W. E. Finken, A. M. Heiter and Charles R. White

[57] ABSTRACT

This torque converter has a fluid flow control member with separate entrance and exit sections formed by packs of relatively movable discs with flow control passages therein. Controls are provided to relatively move the discs to vary converter geometry and the flow path through the entrance section to improve converter operating efficiency. Additional controls are provided to relatively move the discs of the exit section to vary converter geometry and change the fluid flow path through the exit section to provide for converter capacity control.

5 Claims, 5 Drawing Figures

INVENTORS
Warren S. Sherman
Dennis L. Troth
William A. Bennett

By Charles R. White
ATTORNEY

INVENTORS
Warren S. Sherman
Dennis L. Troth
William A. Bennett
By Charles R. White
ATTORNEY

VARIABLE GEOMETRY TORQUE CONVERTER

This invention relates to hydrokinetic torque converters and more particularly to a torque converter having a flow control section with variable entrance and exit flow passages providing a variable geometry converter to improve converter operating efficiency and to provide for converter capacity control.

Torque converters, having fixed flow control passages through the pump, turbine and stator elements, provide a certain stall torque ratio and a peak efficiency at a fixed speed ratio. By changing the direction of the flow control passages, a different fixed geometry converter can be provided in which there is peak efficiency at a different speed ratio. When it is desired to obtain a high efficiency for all speed ratios, an infinite number of flow paths are required to provide the efficient circulation of converter oil under all operating conditions.

In the preferred embodiment of this invention the stator is provided with variable inlet and outlet sections to provide the variable geometry flow paths through the converter so that improved performance can be achieved throughout the speed range of operation. This is accomplished by employing a plurality of stacked discs having aligned openings therein which can be relatively turned to change the alignment of the openings to establish infinitely variable entrance and exit fluid flow passages in the stator. A special cam mechanism is employed to relatively rotate the discs so that a high converter efficiency can be maintained for all converter speed ratios. By changing the exit angle of the stator the converter capacity can be controlled and matched to the power or torque capability of the engine throughout the operating range of the engine.

These and other features, benefits and objects of the invention will become more apparent from the following detailed description and drawings in which.

Figure 1:
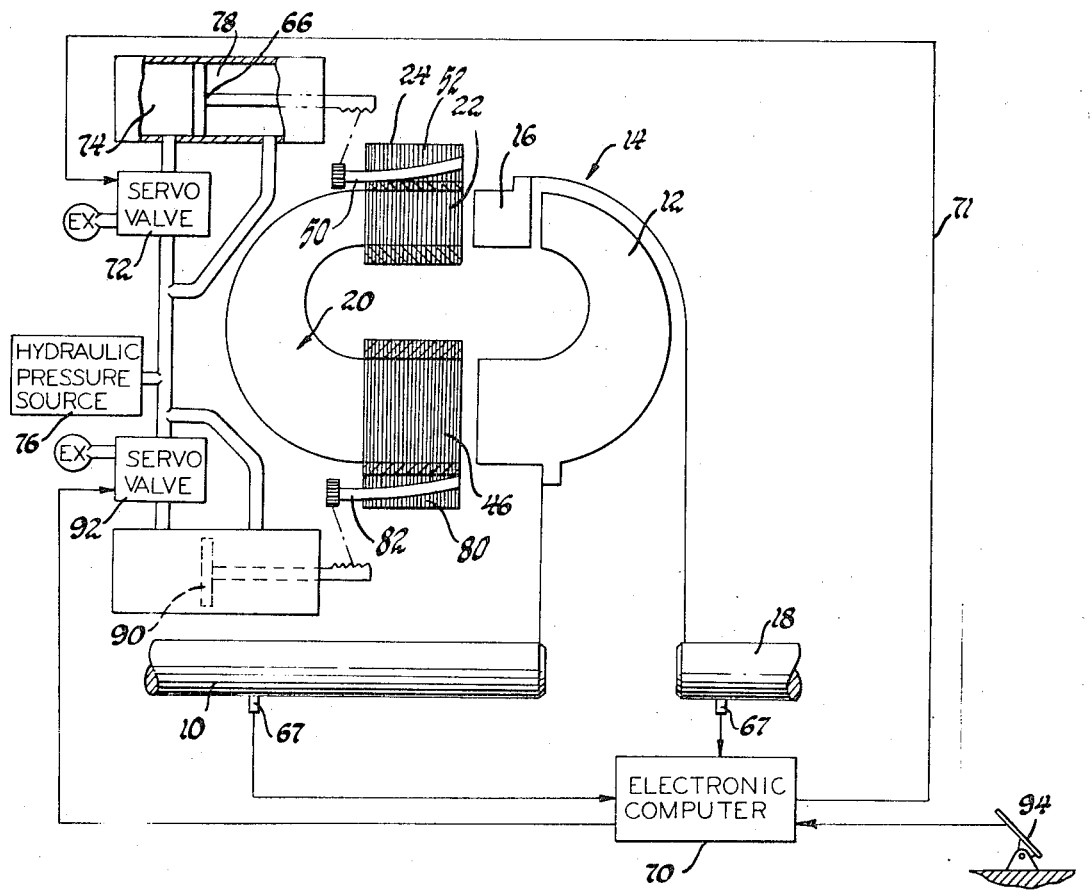
FIG. 1 is a diagrammatic layout of a variable geometry torque converter and controls.
Figure 2:
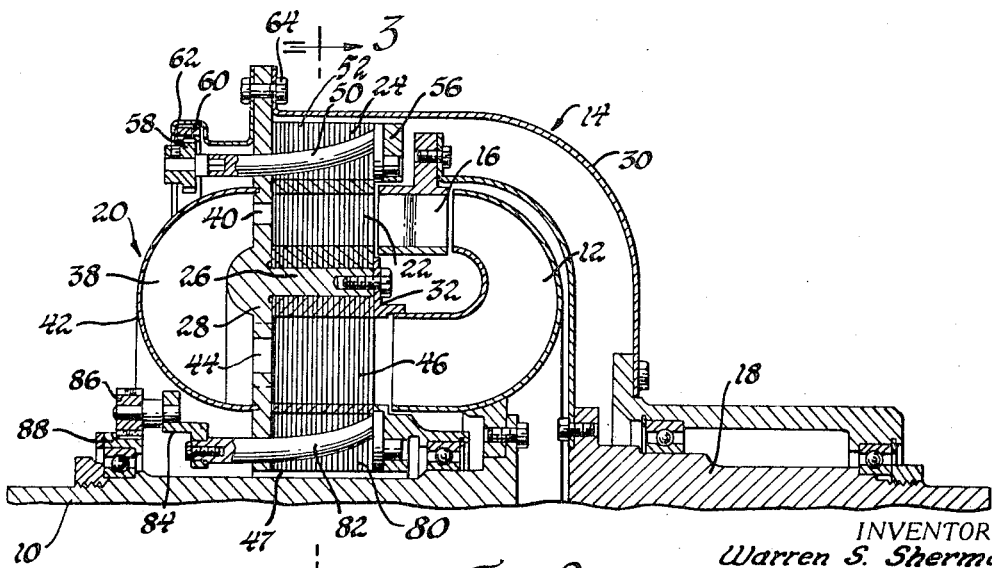
FIG. 2 is a sectional view of the upper portion of a torque converter and controls.
Figure 3:
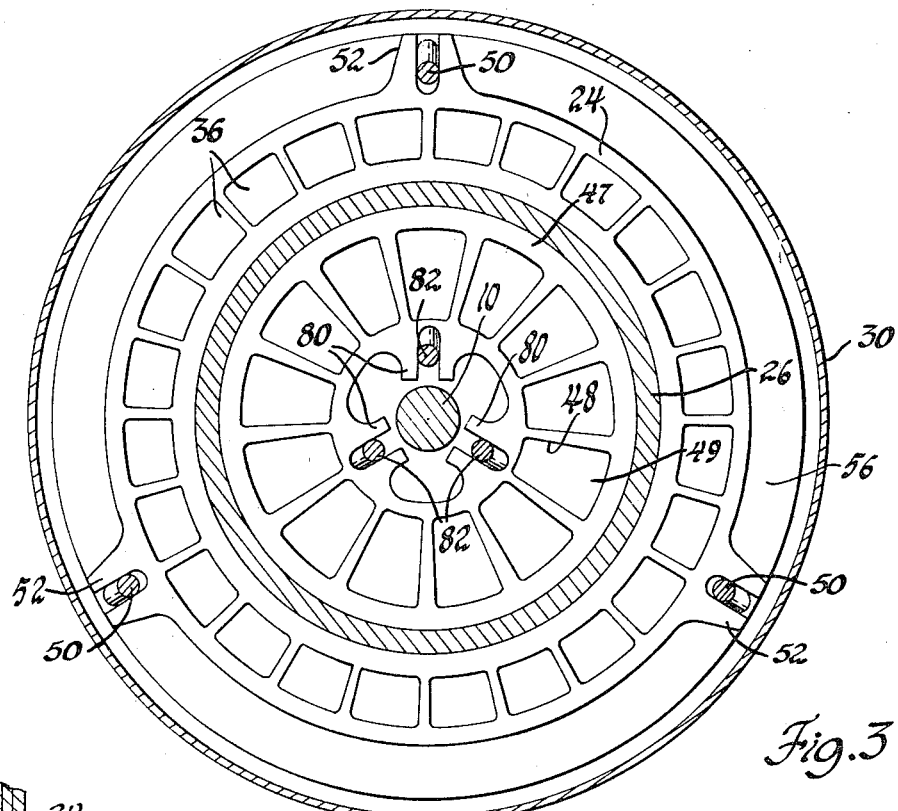
FIG. 3 is a sectional view taken generally along the lines 3—3 of FIG. 2.

As shown in FIGS. 1 and 2, there is an input 10 which is drivingly connected to a pump 12 of a hydrodynamic torque converter 14. This converter has, in addition to the pump 12, a turbine 16 drivingly connected to a power transmission shaft 18 and a special three-section stator 20. The stator has an entrance section 22 comprising a pack of thin discs 24 which are mounted for limited rotational movement on an annular bearing shoulder 26 disposed within the converter and extending rearwardly from a support plate 28 secured to housing 30 of converter 14. The discs 24 are retained in stacked relationship on the annular bearing shoulder 26 by a retainer 32 secured to the extremity of shoulder 26 by bolts or other suitable fasteners.

Figure 5:
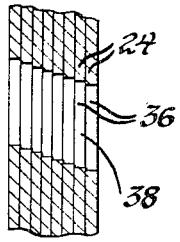
FIG. 5 is a plan view of a portion of the stator showing relative rotation of the discs of the stator.
Figure 4:
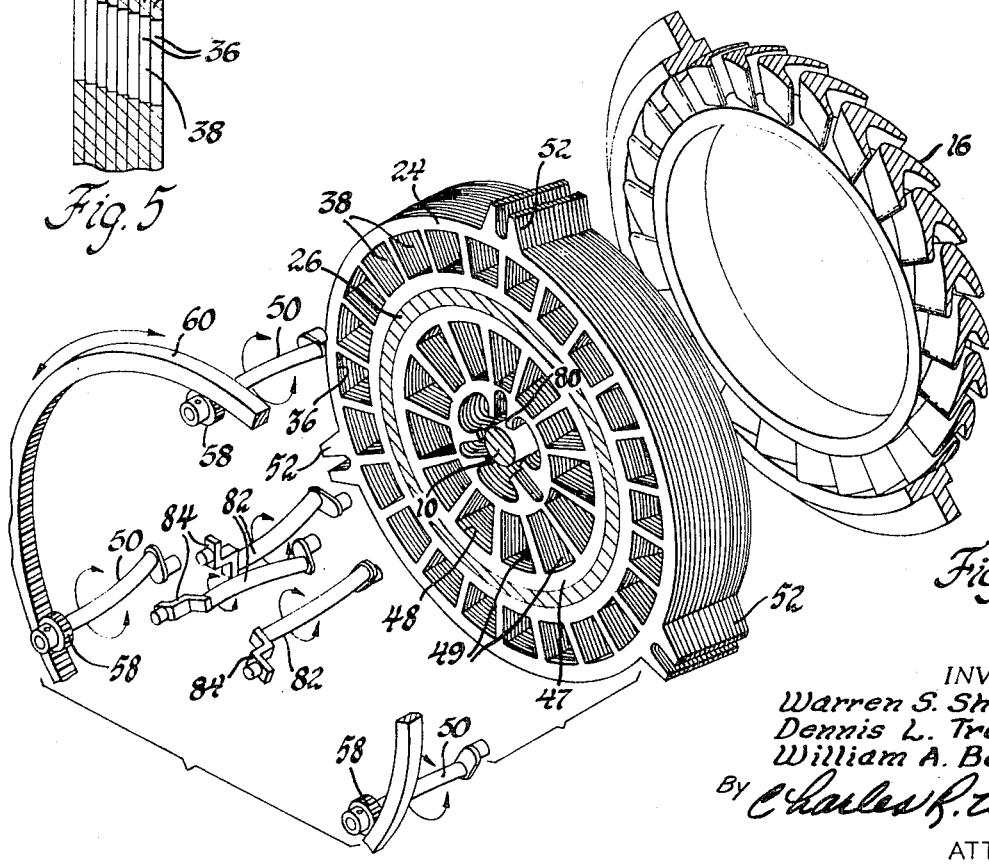
FIG. 4 is an exploded view of the torque converter with the variable geometry stator and stator actuators.

Each disc 24 has a circular arrangement of openings 36 disposed so that the disc pack forms a plurality of fluid flow passages 38 through the entrance section of the stator. With this construction the flow path of the fluid circulated from the turbine can be infinitely varied by changing the angular relationship of the discs. FIG. 5, for example, illustrates relative rotation of discs 24 to a position to change the alignment of openings 36 to vary the entrance angle of the stator. The fluid flow leaving the entrance section of the stator will flow through suitable openings 40 in the support plate into a fixed section 42 of the stator 20 secured to the support plate. From that section the fluid will be guided through suitable openings 44 in the support plate into an exit section 46. The exit section of the stator is similar to the entrance section and is comprised of a stack of thin, relatively movable discs 47 which are substantially the same. Each of these discs has an annular arrangement of openings 48 which when stacked form a variable fluid flow passage 49. As with the entrance section, the discs can be relatively moved to change the flow path of the fluid exiting from the stator.

In the preferred embodiment of this invention suitable cam means are employed to provide for the relative, limited rotation of the discs comprising both the entrance and exit sections of the stator. As shown, there are arranged on the front of the converter three elongated cam members 50, each of which extends through an associated slot formed by the bifurcated extensions 52 that project radially from the discs. The extending end of each cam is mounted for limited pivotal movement in a supporting plate 56 suitably secured in the converter housing. Also each cam extends through and is supported for limited rotation by the support plate 28. A spur gear 58 is fixed to the forward end of each cam and these gears mesh with ring gear 60. This internal gear is supported for rotation in the converter by an annular channel 62 fixed to support plate 28 by bolts 64. With this construction rotation of the ring gear 60 will rotate the spur gears to effect rotation of cams 50 thereby moving each disc relative to each other as determined by the curvature of cam 50. Any suitable mechanism such as hydraulically operated piston 66 may be employed to turn ring gear 60 clockwise or counterclockwise to accordingly turn cams 50.

To provide for the optimum positioning of the stator inlet angle for all converter operations from stall up through coupling, signals are taken by suitable pickups 67 and are fed into computer 70. This computer computes the pump/turbine speed ratios and provides control signals which are continuously fed by a circuit 71 into the servo valve 72. Servo valve 72 opens and closes in accordance with the control signals to control the pressure in a control chamber 74 to keep piston 66 hydrostatically balanced in any adjusted position. Pressure fluid is supplied from source 76 to chamber 74 and to one side of the piston through the servo valve and also from source 76 directly to the pressure chamber 78 and to the opposite side of the piston. With this construction the piston can be positioned at an infinite number of positions as controlled by the computer through the servo valve. The piston is drivingly connected to the internal gear 60 by a gear train or other suitable mechanism to turn the internal gear 58 in response to piston movement. With rotation of the internal gear 60 the cam 50 will be appropriately turned and the relative movement of the plates of the entrance section of the stator will be achieved to change the flow path or the inlet angle of the stator.

The inner discs 47 of the exit section of the stator each have inwardly projecting, bifurcated extensions 80 which provide slots to receive the elongated and curved cams 82. These cams extend through the slots formed by the extension and are rotatably mounted on the support plate 28 and have their far ends mounted for turning movement in plate 56. The forward ends of each of these cams are secured to a crank 84 which is drivingly connected to a spur gear 86. This spur gear meshes with spur gear 88 mounted rotatably on the input shaft by a suitable bearing. A suitable actuator such as piston 90 may be employed to rotate the spur gear 88 and thereby rotate gears 86 to turn cranks 84 and cams 82 to set the exit angle of the stator. Piston 90 is the same as piston 66 and is controlled by a servo valve 92. The servo valve is operatively connected with computer 70 and is controlled by the computer which receives appropriate signals from the positioning of throttle pedal 94 to open and close the servo valve. Piston 90 can be moved to an infinite number of positions to relatively move the discs 47 to change the exit angle of the stator discharge section and thereby control converter capacity. With this control the capacity of the converter is matched with the engine power for all throttle positions.

This invention is not limited to the details of the construction shown and described for purposes of illustrating the invention for other modifications will occur to those skilled in the art.

What is claimed is:

1. A hydrokinetic torque converter comprising pump, turbine, and reactor members providing a torus for the circulation of an operating fluid supplied to said converter, one of said members having fluid passage means providing a variable entrance section and having additional fluid passage means providing a variable exit section for changing the flow path of fluid therethrough, said last-mentioned member having an intermediate section fixed relative to said entrance and exit sections for guiding said fluid from said entrance to said exit section, and first operator means drivingly connected to said entrance section to vary the entrance angle to thereby provide for high converter operating efficiency for all converter speed ratios and second operator means connected to said exit section to vary the exit angle of said exit section to provide for the control of the capacity of said converter.

2. A hydrokinetic torque converter having pump, turbine and stator means arranged in a torus to circulate fluid therein and transmit torque delivered to said pump means to said turbine means, said stator means disposed between said turbine means and said pump means and having an entrance section comprised of a plurality of disc members, each of said disc members having a plurality of fluid flow openings therein and mounted for relative turning movement with respect to each other in said converter to provide an infinitely variable flow path into said stator, said stator means further having an exit section comprised of a plurality of disc members each having a plurality of fluid flow openings which are mounted for relative turning movement with respect to each other to provide an infinitely variable flow path out of said stator into said pump, control means operatively connected to said first disc members for varying the flow path of the inlet section of said stator to provide for high efficiency for all speed ratios of said converter, and control means operatively connected to said second disc members for relatively turning said last-mentioned disc members to change the torque absorption capacity of said torque converter.

3. A hydrokinetic torque converter having pump, turbine and stator means arranged in a torus to circulate fluid therein, said stator having a variable fluid flow entrance section, a fixed section and a variable fluid flow exit section, said entrance section being formed by a plurality of relatively movable discs which are formed in a pack, each of said discs having a plurality of openings therethrough which are aligned to form fluid flow paths through said entrance section and actuator means for relatively moving said discs to an infinite number of settings to provide an infinite number of curved fluid flow paths through said entrance section to improve the efficiency of said converter for all operating speed ratios, said stator having an exit section formed by a plurality of discs formed in a pack, each of said last-mentioned discs having a plurality of flow control openings therein, said last-mentioned opening being aligned to provide a flow control exit passage from said stator into said pump, and actuator means for relatively turning said last-mentioned discs to curve said flow control passage of the fluid exiting from said stator into said pump to thereby change the torque absorption capacity of said converter.

4. In a hydrokinetic torque converter having input and output means, a pump operatively connected to said input means, a turbine operatively connected to said output means, said converter having a three-section stator operatively disposed between said turbine and said pump for circulating fluid from said turbine into said pump, said stator having a first section comprised of a plurality of relatively movable flow control discs each having a plurality of aligned openings therein to provide an infinitely variable flow control passage from said turbine into a fixed section of said stator, operator means for relative turning of said discs so that the flow control passage provided thereby can be controlled in accordance with a predetermined signal to provide for optimum converter operating efficiency, said stator having an exit section comprised of a plurality of flow control discs mounted for relative turning movement within said converter and operator means for relatively turning said last-mentioned discs to predetermined positions to change the flow path from said exit section to thereby change the torque absorption capacity of said converter.

5. The torque converter defined in claim 4 wherein said discs comprising said entrance and outlet sections are coaxial and coplanar and said operator means comprise first and second cam means operatively connected to said first and second flow control discs respectively.

* * * * *